United States Patent
Mottet et al.

(10) Patent No.: US 10,817,867 B2
(45) Date of Patent: Oct. 27, 2020

(54) METHOD FOR CARRYING OUT A TRANSACTION BETWEEN AN APPARATUS AND A MOBILE PHONE

(71) Applicant: Parkeon, Paris (FR)

(72) Inventors: François Mottet, Les Auxons (FR); Gabriel Pequignot, Tours (FR)

(73) Assignee: FLOWBIRD, Paris (FR)

( * ) Notice: Subject to any disclaimer, the term of this patent is extended or adjusted under 35 U.S.C. 154(b) by 0 days.

(21) Appl. No.: 15/158,816

(22) Filed: May 19, 2016

(65) Prior Publication Data
US 2016/0342975 A1    Nov. 24, 2016

(30) Foreign Application Priority Data
May 19, 2015   (FR) ..................... 15 54483

(51) Int. Cl.
*G06Q 20/32* (2012.01)
*H04W 4/80* (2018.01)
(Continued)

(52) U.S. Cl.
CPC ....... *G06Q 20/3278* (2013.01); *G06Q 20/047* (2020.05); *G06Q 20/202* (2013.01);
(Continued)

(58) Field of Classification Search
CPC .... G06Q 10/02; G06Q 20/3278; G06Q 20/38; G06Q 20/32; G06Q 40/00; G08C 15/06
(Continued)

(56) References Cited

U.S. PATENT DOCUMENTS 5,638,302 A * 6/1997 Gerber ................... B60R 13/10
                                                                  116/33
6,026,367 A * 2/2000 Hjelmvik ............. G06Q 20/127
                                                                  194/209
(Continued)

FOREIGN PATENT DOCUMENTS

WO   WO-2015036755   3/2015
WO   WO-2015059389   4/2015

OTHER PUBLICATIONS

Machine Translation of Gaber (WO 2015/059389 A1 ), https://google.com/patents/WO2015059389A1?cl=en[Oct. 7, 2016 3:07:58 PM].*
(Continued)

*Primary Examiner* — Oluseye Iwarere
(74) *Attorney, Agent, or Firm* — B. Aaron Schulman, Esq.; Stites & Harbison, PLLC

(57) ABSTRACT

Proposed is a method for carrying out a transaction between a mobile telephone (6) and a sales apparatus (45), the telephone (6) comprising a first memory (40) for storing an identifier (I), the identifier (I) being able to identify the mobile telephone (6) uniquely, the method comprising the following steps:
  a) reception of the identifier by radiofrequency communication via the sales apparatus (45),
  b) identification of the mobile telephone (6) by the sales apparatus (45) from the identifier received during the first sending step, and
  c) generation by the sales apparatus (45) of a proof of purchase comprising a signature computed by the sales apparatus (45) and able to authenticate the proof of purchase, the proof of purchase (PA) being a transportation title.

8 Claims, 3 Drawing Sheets

(51) Int. Cl.
| | |
|---|---|
| *H04W 12/08* | (2009.01) |
| *G06Q 20/22* | (2012.01) |
| *G06Q 20/38* | (2012.01) |
| *H04W 12/10* | (2009.01) |
| *G06Q 20/04* | (2012.01) |
| *G06Q 20/20* | (2012.01) |
| *H04L 29/08* | (2006.01) |
| *H04W 12/06* | (2009.01) |
| *H04W 12/00* | (2009.01) |
| *H04W 88/02* | (2009.01) |

(52) U.S. Cl.
CPC ............ *G06Q 20/22* (2013.01); *G06Q 20/322* (2013.01); *G06Q 20/3276* (2013.01); *G06Q 20/3825* (2013.01); *H04L 67/303* (2013.01); *H04W 4/80* (2018.02); *H04W 12/06* (2013.01); *H04W 12/08* (2013.01); *H04W 12/10* (2013.01); *H04L 2463/102* (2013.01); *H04W 12/00512* (2019.01); *H04W 12/00522* (2019.01); *H04W 88/02* (2013.01)

(58) Field of Classification Search
USPC .............. 705/5, 71, 40; 340/870.03; 235/384
See application file for complete search history.

(56) References Cited

U.S. PATENT DOCUMENTS

| | | | | | |
|---|---|---|---|---|---|
| 6,047,268 | A * | 4/2000 | Bartoli | ............... | G06Q 20/02 705/35 |
| 6,192,349 | B1 * | 2/2001 | Husemann | ............ | G06K 17/00 705/41 |
| 6,411,937 | B1 * | 6/2002 | Brusseaux | ............ | G06Q 20/20 340/932.2 |
| 6,690,794 | B1 * | 2/2004 | Terao | ............ | H04L 9/3013 235/375 |
| 6,725,376 | B1 * | 4/2004 | Sasmazel | ............ | G06F 21/33 713/176 |
| 6,842,741 | B1 * | 1/2005 | Fujimura | ............ | G06Q 20/342 705/1.1 |
| 7,084,736 | B2 | 8/2006 | Ritter | ............ | G06Q 20/4014 340/5.6 |
| 8,210,921 | B1 * | 7/2012 | Karpe | ............ | B26F 3/002 225/106 |
| 8,225,997 | B1 * | 7/2012 | Bierbaum | ......... | G06Q 20/0453 235/375 |
| 9,183,551 | B2 * | 11/2015 | Nuzzi | ............ | G06Q 20/0457 |
| 9,292,838 | B2 * | 3/2016 | Koh | ............ | G06Q 20/10 |
| 10,108,910 | B2 * | 10/2018 | Kotecha | ............ | G06Q 10/02 |
| 2002/0028671 | A1 * | 3/2002 | I'Anson | ............ | H04W 4/02 455/414.1 |
| 2002/0042729 | A1 * | 4/2002 | Yajima | ............ | G06Q 10/02 705/5 |
| 2002/0069176 | A1 * | 6/2002 | Newman | ............ | G06Q 20/02 705/53 |
| 2002/0094090 | A1 * | 7/2002 | Iino | ............ | G06F 21/6209 380/282 |
| 2003/0093695 | A1 * | 5/2003 | Dutta | ............ | G06Q 20/045 726/4 |
| 2004/0030658 | A1 * | 2/2004 | Cruz | ............ | G06Q 20/045 705/65 |
| 2004/0203909 | A1 * | 10/2004 | Koster | ............ | H04W 4/02 455/456.1 |
| 2005/0021364 | A1 * | 1/2005 | Nakfoor | ............ | G06F 21/33 235/382 |
| 2005/0240484 | A1 * | 10/2005 | Yan | ............ | G06Q 20/045 455/411 |
| 2007/0017979 | A1 * | 1/2007 | Wu | ............ | G06Q 30/06 235/382 |
| 2007/0244731 | A1 * | 10/2007 | Barhydt | ............ | G06Q 10/02 705/5 |
| 2007/0260543 | A1 * | 11/2007 | Chappuis | ............ | G06Q 20/045 705/44 |
| 2008/0015983 | A1 * | 1/2008 | Spikes | ............ | G06Q 10/02 705/40 |
| 2008/0235123 | A1 * | 9/2008 | Olliphant | ............ | G06Q 20/12 705/35 |
| 2009/0282256 | A1 | 1/2009 | Rakic et al. | | |
| 2009/0098825 | A1 * | 4/2009 | Huomo | ............ | G06Q 20/20 455/41.1 |
| 2009/0132423 | A1 * | 5/2009 | Liu | ............ | G06Q 20/10 705/70 |
| 2009/0254930 | A1 | 10/2009 | Lo et al. | | |
| 2009/0281947 | A1 * | 11/2009 | Erel | ............ | G06Q 20/40 705/44 |
| 2009/0292619 | A1 * | 11/2009 | Kagan | ............ | G06Q 20/102 705/26.1 |
| 2010/0113072 | A1 * | 5/2010 | Gibson | ............ | G06Q 20/045 455/466 |
| 2010/0122274 | A1 | 5/2010 | Gillies et al. | | |
| 2010/0144375 | A1 * | 6/2010 | Pfister | ............ | G07B 15/02 455/456.5 |
| 2010/0219234 | A1 * | 9/2010 | Forbes | ............ | G06Q 10/02 235/375 |
| 2010/0293013 | A1 * | 11/2010 | Ritter | ............ | G06Q 10/02 705/5 |
| 2011/0062231 | A1 * | 3/2011 | Wang | ............ | G06O 20/045 235/379 |
| 2011/0131083 | A1 * | 6/2011 | Redmann | ............ | B60L 11/1848 705/13 |
| 2011/0143779 | A1 * | 6/2011 | Rowe | ............ | H04W 4/02 455/456.3 |
| 2011/0321168 | A1 * | 12/2011 | Amit | ............ | G06F 21/31 726/26 |
| 2012/0030124 | A1 * | 2/2012 | Cronkright, II | ....... | G06Q 10/06 705/316 |
| 2012/0061465 | A1 * | 3/2012 | Luo | ............ | G06K 7/10237 235/380 |
| 2012/0095791 | A1 * | 4/2012 | Stefik | ............ | G06Q 10/02 705/5 |
| 2012/0096499 | A1 * | 4/2012 | Dasher | ............ | H04N 21/4223 725/87 |
| 2012/0130775 | A1 * | 5/2012 | Bogaard | ............ | G06Q 30/0284 705/13 |
| 2012/0130891 | A1 * | 5/2012 | Bogaard | ............ | G06Q 20/102 705/40 |
| 2012/0203600 | A1 * | 8/2012 | Fiorucci | ............ | G07F 17/242 705/13 |
| 2012/0218122 | A1 * | 8/2012 | Bogaard | ............ | G07B 15/02 340/870.03 |
| 2012/0265585 | A1 * | 10/2012 | Muirbrook | ............ | G06Q 20/20 705/13 |
| 2012/0265685 | A1 * | 10/2012 | Brudnicki | ............ | H04W 12/06 705/44 |
| 2012/0319651 | A1 * | 12/2012 | Outwater | ............ | B60L 11/1816 320/109 |
| 2013/0029744 | A1 * | 1/2013 | Harding | ............ | G07F 17/3225 463/17 |
| 2013/0117079 | A1 * | 5/2013 | Ioli | ............ | G06Q 20/40 705/13 |
| 2013/0124270 | A1 * | 5/2013 | Tziperman | ............ | G07B 15/02 705/13 |
| 2013/0151292 | A1 * | 6/2013 | Van Deloo | ............ | G06Q 10/02 705/5 |
| 2013/0173316 | A1 * | 7/2013 | Agrawal | ............ | G06Q 10/02 705/5 |
| 2013/0200999 | A1 * | 8/2013 | Spodak | ............ | G05B 1/01 340/5.65 |
| 2013/0262160 | A1 * | 10/2013 | Miller | ............ | G06Q 10/02 705/5 |
| 2013/0262275 | A1 * | 10/2013 | Outwater | ............ | G06Q 10/02 705/27.1 |
| 2013/0268304 | A1 * | 10/2013 | Doshi | ............ | G06Q 10/02 705/5 |
| 2013/0282448 | A1 * | 10/2013 | Rydbeck | ............ | G06Q 20/145 705/13 |

(56) References Cited

U.S. PATENT DOCUMENTS

| | | | |
|---|---|---|---|
| 2014/0085110 A1* | 3/2014 | Scofield | G07B 15/04 340/932.2 |
| 2014/0279558 A1* | 9/2014 | Kadi | G06Q 20/3278 705/71 |
| 2014/0288980 A1* | 9/2014 | Lee | G06Q 10/02 705/5 |
| 2014/0304721 A1* | 10/2014 | Manuel-Devadoss | H04N 21/2543 725/5 |
| 2014/0310126 A1* | 10/2014 | Baazov | H04W 48/04 705/26.25 |
| 2014/0316992 A1* | 10/2014 | Povolny | G06Q 20/0457 705/71 |
| 2015/0046285 A1* | 2/2015 | Baazov | G06Q 50/34 705/26.25 |
| 2015/0058191 A1* | 2/2015 | Khan | G06Q 20/42 705/35 |
| 2015/0066558 A1* | 3/2015 | Kimiagar | G06Q 10/06313 705/7.17 |
| 2015/0170113 A1* | 6/2015 | Grote | G06Q 20/0855 705/39 |
| 2015/0221140 A1* | 8/2015 | Eid | G07B 15/063 705/13 |
| 2015/0242824 A1* | 8/2015 | Stafford | H04W 12/06 705/44 |
| 2015/0365884 A1* | 12/2015 | Ljung | H04W 48/16 455/436 |
| 2016/0012726 A1* | 1/2016 | Wang | G08G 1/0112 340/932.2 |
| 2016/0035159 A1* | 2/2016 | Ganapathy Achari | G06F 21/34 340/5.61 |
| 2016/0078434 A1* | 3/2016 | Huxham | G07F 19/204 705/71 |
| 2016/0165395 A1* | 6/2016 | Long | H04W 4/023 455/456.3 |
| 2016/0196550 A1* | 7/2016 | Chaudhry Basit | G06Q 20/367 705/41 |
| 2016/0267451 A1* | 9/2016 | Eid | G06Q 10/08 |
| 2016/0309327 A1* | 10/2016 | Grimault | H04L 63/123 |
| 2016/0364719 A1* | 12/2016 | Jeon | G06Q 20/3278 |
| 2017/0140592 A1* | 5/2017 | Pluss | H04W 12/04 |
| 2018/0150922 A1* | 5/2018 | Lyman | G06O 30/0215 |
| 2018/0204203 A1* | 7/2018 | Pertet | G06Q 20/327 |

OTHER PUBLICATIONS

International Search Report for FR1554483 dated Apr. 4, 2016.

* cited by examiner

METHOD FOR CARRYING OUT A TRANSACTION BETWEEN AN APPARATUS AND A MOBILE PHONE

The present application claims the priority of patent application FR15 54483, filed on May 19, 2015, which is hereby incorporated by reference.

FIELD OF THE INVENTION

The present invention relates to a method for carrying out a transaction between a mobile telephone and a sales apparatus. The invention also relates to a method for verifying a proof of purchase generated during such a sale. The invention further relates to a method for purchasing a product from a sales apparatus using a mobile telephone. The invention also relates to computer program products associated with the above methods. The invention also relates to a sales apparatus.

BACKGROUND OF THE INVENTION

A mobile telephone is frequently equipped with an information processing unit able to carry out functions different from telephonic communication alone. For example, the information processing unit is able to run electronic games, or to store video files.

It is in particular known to use the information processing unit of a mobile telephone to store a proof of purchase for a transportation title. For example, the transportation title is purchased from a centralized server using the Internet, then sent to the mobile telephone through the mobile telephony network to which the mobile telephone belongs. To enable the authentication of the transportation title, the proof of purchase is displayed on the screen of the telephone, for example in the form of a matrix code.

A mobile telephone furthermore frequently includes a telephonic communication module and at least one module allowing short-range communication with other electronic devices. Such short-range communication modules are for example used to transfer data from one telephone to another in the context of electronic games, or to allow the use of wireless earphones.

Short-range wireless communication modules are generally based on the use of radiofrequency electromagnetic waves. The radiofrequency electromagnetic waves, also called radio waves, are the electromagnetic waves whose frequency is comprised between 3 KiloHertz (KHz) and 3 GigaHertz (GHz).

The distance over which a radiofrequency electromagnetic wave propagates depends on the frequency of the wave. For example, the frequency band from 2400 to 2483 MegaHertz (MHz) is used by communication modules based on the Bluetooth protocol, the range of which is generally several tens of meters.

Short-range communication modules of the aforementioned type are sometimes integrated into stationary facilities such as product display shelves, and for example allow a user to receive information on his telephone about a product offered for sale. Sales terminals provided with short-range communication modules further make it possible to purchase a product using a mobile telephone.

However, the proposed transactions are not secured, since it is possible to counterfeit or duplicate the proof of purchase received by the mobile telephone.

SUMMARY OF THE INVENTION

There is therefore a need for a method for carrying out a transaction, in particular a method allowing the purchase of a product, using a mobile telephone, from a sales apparatus, that is more secure.

To that end, a method is proposed for carrying out a transaction between a mobile telephone and a sales apparatus, the telephone comprising a first memory for storing an identifier, the identifier being able to identify the mobile telephone uniquely, the method comprising the following steps:
 a) reception of the identifier via radiofrequency communication by the sales apparatus,
 b) identification of the mobile telephone by the sales apparatus from the identifier received during the reception step, and
 c) generation by the sales apparatus of a proof of purchase comprising a signature computed by the sales apparatus and able to authenticate the proof of purchase, the proof of purchase being a transportation title.

According to one particular embodiment, the method for carrying out a transaction comprises one or more of the following features, considered alone or according to any technically possible combination(s):
 the signature is computed by the sales apparatus from at least the received identifier.
 the method comprises a step d) for sending the proof of purchase from the sales apparatus to the mobile telephone by radiofrequency communication.
 the radiofrequency communications have at least one frequency greater than or equal to 2400 MHz and less than or equal to 2483.5 MHz.
 the method further comprises the following steps:
 e) generation, by the sales apparatus, of a cookie for the sale,
 f) communication, by the sales apparatus, of the cookie to a remote electronic device, and
 h) generation, by the remote device, of a bill from at least the received cookie.

Also proposed is a method for verifying the purchase of a product via a mobile telephone, the method comprising the following steps:
 i) carrying out a method for performing a transaction,
 j) transferring the proof of purchase from the mobile telephone to a verification apparatus by radiofrequency communication, and
 k) authentication by the verification apparatus of the signature of the proof of purchase.

According to one particular embodiment, the verification method further comprises the following steps:
 j1) transferring the identifier from the mobile telephone to the verification apparatus,
 k1) computation, by the verification apparatus, of an identifier computed from the signature,
 and the authentication step k) comprises a comparison of the computed identifier and the received identifier.

Also proposed is a method for purchasing a product from a sales apparatus via a mobile telephone comprising a first memory and a radiofrequency communication module, the method comprising the steps of:
 a1) sending, by radiofrequency communication, of an identifier of the mobile telephone to the sales apparatus,
 d1) reception, by the mobile telephone, by radiofrequency communication, of a proof of purchase comprising an authentication signature, and l) storage of the proof of purchase in the memory of the mobile telephone.

Also proposed is a computer program product including software instructions which, when executed by a controller, carry out a method as described above.

Also proposed is a sales apparatus able to receive, by radiofrequency communication, an identifier of a mobile telephone, identify the mobile telephone from the received identifier, compute an authentication signature, and generate a proof of purchase comprising the computed signature.

BRIEF DESCRIPTION OF THE DRAWINGS

The features and advantages of the invention will appear upon reading the following description, provided solely as a non-limiting example, and done in reference to the appended drawings, in which.

DETAILED DESCRIPTION OF PREFERRED EMBODIMENTS

Figure 1:
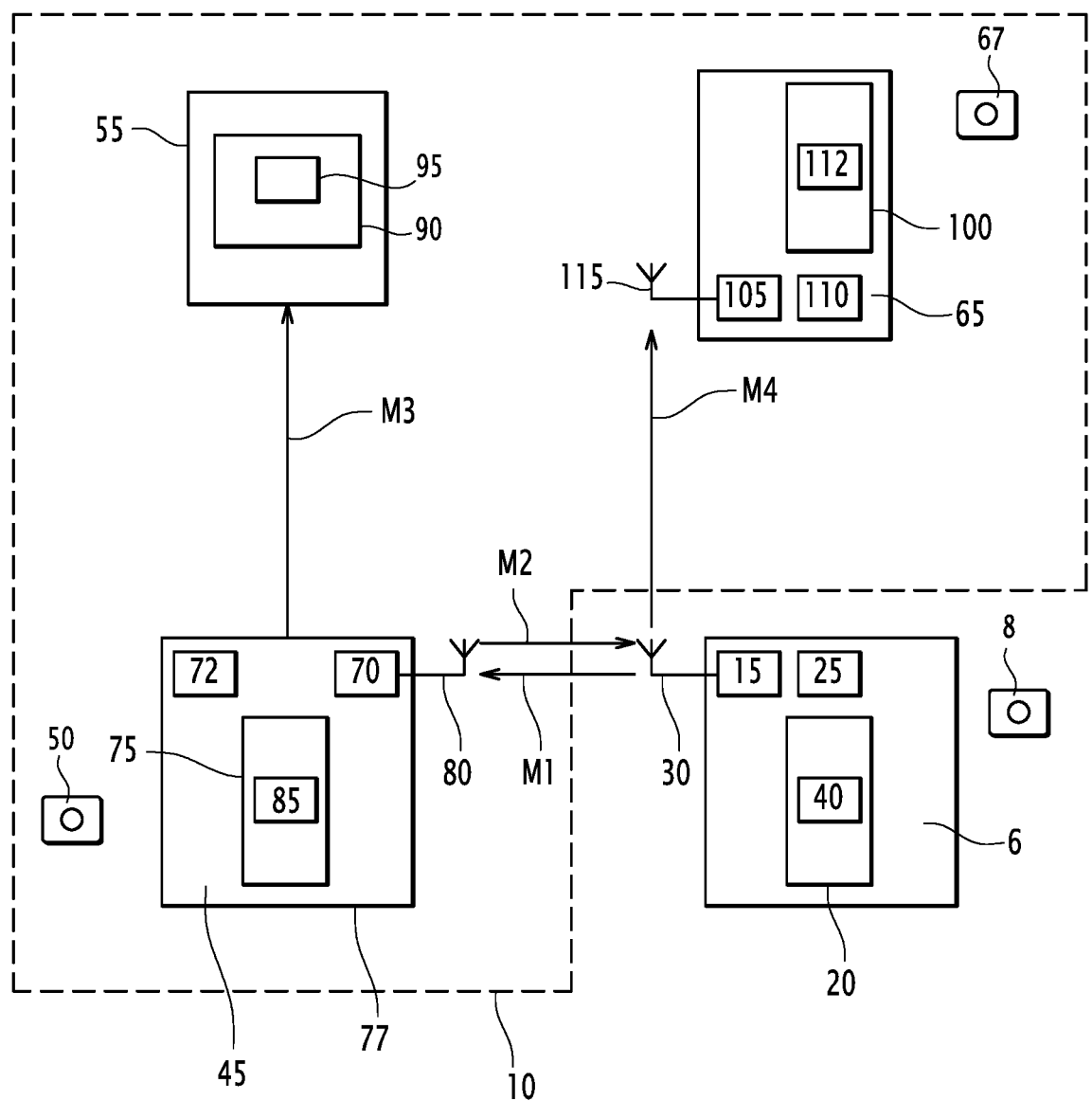
FIG. 1 is a diagrammatic illustration of a sales facility, a mobile telephone and a verification apparatus.

A telephone 6, a first computer program product 8 and a facility 10 are shown in FIG. 1.

The telephone 6 is able to allow a user U of the telephone 6 to purchase a product P from the facility 10.

The product P is for example a usage right for transportation means.

According to another example, the product P is an object such as a piece of furniture that the user U is invited to pick up from a store or warehouse.

The telephone 6 is a mobile telephone. This means that the telephone 6 is able to be transported by the user U and to exchange telephony data Dt with another telephone 6 through a wireless telephony network R.

Preferably, the telephone 6 is able to exchange telephony data Dt through the network R by radiofrequency communication.

The term "radiofrequency communication" refers to the exchange of data via a signal including at least one radiofrequency electromagnetic wave REW.

The telephony data Dt can allow the reproduction of human speech by a telephone.

The telephone 6 comprises a transceiver module 15, a first controller 20 and a man/machine interface 25.

The transceiver module 15 is a radiofrequency communication module. This means that the transceiver module 15 is able to transmit or receive data sent via a signal including at least one radiofrequency electromagnetic wave REW.

Preferably, the transceiver module 15 is able to transmit and receive data sent via a signal including at least one radiofrequency electromagnetic wave REW.

The radiofrequency electromagnetic waves REW are electromagnetic waves having a frequency comprised between 3 kHz and 3 GHz.

The transceiver module 15 comprises a first antenna 30.

The transceiver module 15 is for example able to transmit or receive an electromagnetic wave REW having a frequency greater than or equal to 2400 MHz and less than or equal to 2483.5 MHz.

Preferably, the transceiver module 15 is able to transmit and receive an electromagnetic wave REW having a frequency greater than or equal to 2400 MHz and less than or equal to 2483.5 MHz.

Advantageously, the transceiver module 15 uses a Bluetooth communication protocol. Bluetooth is a communication standard allowing the two-way exchange of data over very a short distance. The standards defining the Bluetooth protocols are defined by the "Bluetooth Special Interest Group".

Alternatively, the transceiver module 15 is able to transmit or receive an electromagnetic wave having a frequency greater than or equal to 13.553 MHz and less than or equal to 13.567 MHz.

Preferably, the transceiver module 15 is able to transmit and receive an electromagnetic wave having a frequency greater than or equal to 13.553 MHz and less than or equal to 13.567 MHz.

Advantageously, the transceiver module 15 uses a near-field communication (NFC) protocol. Near-field communication is a short-range and high-frequency wireless communication technology, making it possible to exchange information between peripherals at a distance of up to about 10 centimeters (cm). The NFC technology is an extension of standard ISO/CEI 14443.

The first controller 20 is able to manipulate and/or convert data represented as electronic or physical quantities in registers of the first controller 20 and/or in memories into other similar data corresponding to physical data in memory, registers or other types of display, transmission or storage devices.

The first controller 20 is further able to exchange data with the first communication module 15 and the man/machine interface 25.

The first controller 20 is also configured to send data to a server (not shown) via the wireless telephony network R.

The first controller 20 includes a first memory 40.

The first memory 40 is able to store an identifier I of the telephone 6.

The identifier I is able to identify the telephone 6. This means that the identifier I is associated with a single telephone 6.

For example, the identifier I comprises a serial number of the telephone 6.

Advantageously, the identifier I comprises an IMEI (International Mobile Equipment Identity) number of the telephone 6. The IMEI number is a unique number assigned to a single telephone 6, and used by telephony operators to identify and authorize, or not authorize, the telephone 6 to connect.

The IMEI number is directly associated with the telephone 6 and not with the user U. The IMEI number is in particular used to block a stolen telephone with all operators having subscribed to the IMEI database.

Preferably, the identifier I is an identifier transmitted to the telephone 6 by an operator of facility 10 following a payment of a predetermined amount, called amount due Mp, by the user U.

The first computer program product 8 comprises program instructions.

The first computer program 8 can be loaded on the first controller 20 and is suitable for driving the implementation of a method for purchasing the product P when the first computer program 8 is executed on the first controller 20.

The facility 10 is a sales facility. The facility 10 is able to sell the product P to the user U and verify the purchase of the product P by the user U.

The facility 10 comprises a sales apparatus 45, a second computer program product 50, a centralization unit 55, a third computer program product, a verification apparatus 65 and a fourth computer program product 67.

The sales apparatus 45 is configured to sell the product P to the user U of the telephone 6.

The sales apparatus 45 is stationary. This means that the sales apparatus 45 cannot be moved by the user U.

For example, the sales apparatus 45 is fixed to the inside of a public transportation vehicle, such as a bus or tram. For example, the sales apparatus is fastened to the floor of the vehicle.

Alternatively, the sales apparatus 45 is fastened to a wall. For example, the sales apparatus 45 is sealed in the wall.

The sales apparatus 45 is an automaton.

"Automaton" refers to a multiservice electromechanical device such as a multiservice electromechanical transportation ticketing device for public transportation for persons. For example, the sales apparatus 45 is able to compost a transportation ticket.

Alternatively, the sales apparatus 45 is a parking management apparatus.

This means that the sales apparatus 45 is further configured to sell the user U a parking ticket. For example, the parking ticket is a printed ticket. Alternatively, the parking ticket is a computer file able to be stored in the memory 40 of the telephone 6.

A timestamping device is one particular example of an automaton.

The sales apparatus 45 comprises a first transmission module 70, a second man/machine interface 72, a second controller 75 and a body 77.

The first transmission module 70 comprises an antenna 80.

The first transmission module 70 is able to exchange information with the transceiver module 15. Preferably, the first transmission module 70 is a radiofrequency communication module.

The second man/machine interface 72 is configured to allow a user U of the sales apparatus 45 to exchange information with the second controller 75.

The second man/machine interface 72 for example includes a touchscreen.

The second controller 75 is able to exchange information with the centralization device 55.

For example, the second controller 75 is connected to the centralization device 55 by a wired link such as an Ethernet link. Ethernet is a family of network protocols defined by standard IEEE 802.3.

Alternatively, the second controller 75 is connected to the centralization device 55 by a wireless link, such as a radiofrequency link.

The second controller 75 includes a second memory 85.

The second memory 85 comprises a first list L1 of identifiers I.

Advantageously, each identifier I of the first list L1 is associated with a user U having registered with the operator of the facility 10.

The second computer program product 50 comprises program instructions.

The second computer program 50 can be loaded on the second controller 75 and is suitable for driving the implementation of the method for performing a transaction when the second computer program 50 is implemented on the second processor 82.

The second controller 75 and the first transmission module 70 are positioned inside the body 77. The body 77 is then able to isolate the second controller 75 and the first transmission module 70 from the outside of the sales apparatus 45.

The centralization device 55 is able to exchange data with the sales apparatus 45.

The centralization device 55 is an electronic device. This means that the centralization device 55 includes at least one module able to receive, modify or send information in the form of electric signals. For example, the centralization device 55 is a computer server.

The centralization device 55 is remote from the sales apparatus 45. This means that the centralization device 55 is not comprised in the body 77 of the sales apparatus 45.

The centralization device 55 comprises a third controller 90.

The third controller 90 is able to exchange information with the second controller 75. Preferably, the third controller 90 is configured to exchange information with each second controller 75 of a plurality of sales apparatuses 45.

The third controller 90 comprises a third memory 95.

The third memory 95 includes a first table T1 comprising at least one identifier I and information IU on the user U.

Preferably, the first table T1 comprises a plurality of identifiers I.

Each identifier I of the first table T1 is associated with a single user U. The identifier I of the telephone 6 is associated with the user U.

The information on the user IU for example comprises the name of the user U, a billing address and/or a bank account number.

The third controller 90 is, for example, able to record a payment of a predetermined amount by the user U and to respond by transmitting the identifier I to the mobile telephone 6. For example, the third controller 90 is able to transmit, by radiofrequency communication, a payment certificate comprising at least the identifier I to the mobile telephone 6.

The third computer program product comprises program instructions.

The third computer program can be loaded on the third controller 90 and is suitable for driving the implementation of the method for performing a transaction when the second computer program is implemented on the third controller 90.

The verification apparatus 65 is configured to verify the purchase by the user U of the mobile telephone 6 of the product P, and to communicate the results of the verification to a user U.

The verification apparatus 65 is preferably a mobile electronic apparatus. The verification apparatus 65 is for example a mobile telephone. Alternatively, the verification apparatus 65 is a dedicated electronic apparatus.

The verification apparatus 65 includes a fourth controller 100, a second transmission module 105 and a third man/machine interface 110.

The fourth controller 100 is able to exchange information with the second transmission module 105 and the third man/machine interface 110.

The fourth controller 100 includes a fourth memory 112.

The second transmission module 105 comprises an antenna 115.

The second transmission module 105 is able to exchange information with the transceiver module 15. Preferably, the second transmission module 105 is a radiofrequency communication module.

The third man/machine interface 110 is configured to allow a user U of the verification apparatus 65 to exchange information with the fourth controller 100.

The third man/machine interface 110 for example includes a touchscreen, and a speaker.

The fourth computer program product 67 comprises program instructions.

The fourth computer program 67 can be loaded on the fourth controller 100 and is able to drive the implementation of a method for verifying the purchase of a product P by the user U when the fourth computer program 67 is implemented on the fourth controller 100.

The operation of the facility 8 will now be described.

Figure 2:
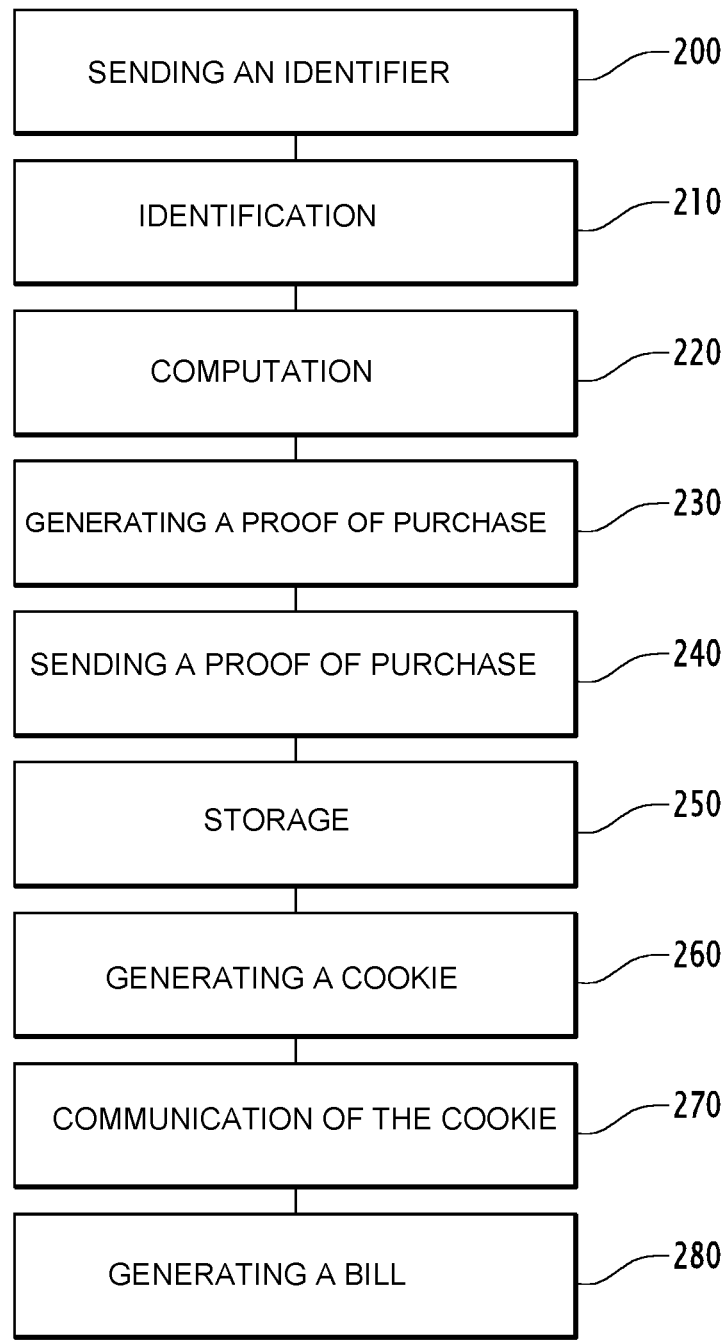
FIG. 2 is a flowchart of one example implementation of a method for carrying out a transaction.

FIG. 2 shows the steps of a method for carrying out a transaction between the sales apparatus 45 and the telephone 6.

The term "transaction" designates the sale of the product P, i.e., the provision of the product P to the user U in exchange for the payment of an amount due Mp.

The method for carrying out a transaction comprises a step 200 for sending an identifier I, an identification step 210, a computation step 220, a step 230 for generating a proof of purchase PA, a step 240 for sending a proof of purchase PA, a storage step 250, a step 260 for generating a cookie T, a step 270 for communication of the cookie T, and a step 280 for generating a bill F.

The identification 210, computation 220, proof of purchase PA generation 230, cookie T generation 260 and cookie T sending 270 steps are carried out by the sales apparatus 45.

The step 200 for sending the identifier I and the step 240 for sending the proof of purchase PA are implemented jointly by the sales apparatus 45 and the telephone 6.

The storage step 250 is carried out by the telephone 6.

When the step 200 for sending the identifier I, the step 240 for sending the proof of purchase PA and the storage step 250 are carried out by the telephone 6, the step 200 for sending the identifier I, the step 240 for sending the proof of purchase PA and storage step 250 form a purchase method, by telephone 6, for the product P from the sales apparatus 45.

The proof of purchase PA is able to demonstrate, during a verification operation, the purchase of the product P by the user U of the telephone 6.

The proof of purchase PA is a computer file, i.e., a set of information able to be stored by a memory 40.

The proof of purchase PA includes description data D for the purchased product P and a signature S.

The description data D is able to identify the product P purchased by the user U of the telephone 6.

For example, the description data D is associated with a single product P. Alternatively, the description data D is associated with a set of products P that are indiscernible from one another.

The description data D for example comprises a set of product P characteristics.

When the product P is a piece of furniture, the description data D comprises the name, size and color of the product P.

When the product P is a usage right for a transportation network, the proof of purchase PA is a transportation title.

This means that, during a verification operation, it is considered that the user U is authorized to use the transportation network if the user U has the proof of purchase PA. If the user U does not have the proof of purchase PA, it is considered that the user U is not authorized to use the transportation network.

A transportation title, in order to have a contractual value, must have been the object of a payment and have been validated (or composted) by an apparatus that thus finalizes the sale of the transportation title. This validation is, for example, performed by inserting the signature S into the proof of purchase PA.

The description data D for example comprises a start time for validity of the transportation title, an end time for validity of the transportation title, the name of a departure train station and/or the name of an arrival train station.

Optionally, the description data D comprises an identifier of the product P, such as the serial number.

According to another example, the memory 112 of the verification apparatus 65 comprises a hash table Tab comprising characteristics of a plurality of products P, and the description data D is able to indicate the position of the characteristics of the product P in the hash table Tab.

For example, the description data D may allow the verification apparatus 65 to compute, according to a hash function H, an index i identifying the position of the characteristics of the product P in the hash table Tab.

The signature S is a set of data able to authenticate the proof of purchase PA. This means that the signature S is able to allow the verification apparatus 65 to verify that the proof of purchase PA has been generated by the sales apparatus 45.

For example, the signature S is a decimal number generated randomly each day and stored in the second memory 85.

Preferably, the signature S is further able to identify the telephone 6. This means that the signature S is associated with a single telephone 6.

For example, when the identifier I is a number, the signature S comprises a number computed from the identifier I according the first mathematical function F1.

The first function F1 preferably has a reciprocal function F2 associating the identifier I with the signature S.

Alternatively, the signature S is the result of the encryption of at least the identifier I using an encryption algorithm A.

The encryption algorithm A has an encryption key K.

The encryption algorithm is for example the "advanced encryption standard" (also known as "AES" or "Rijndael"). The AES algorithm is defined in standard ISO/IEC 18033-3.

According to another alternative, a second list L2 of identifiers is stored in the memory 112 of the verification apparatus and the signature S includes information identifying the position of the identifier I of the telephone 6 in the second list L2.

For example, the signature S is able to allow the verification apparatus 65 to compute, according to the hash function H, an index j identifying the position of the identifier I of the telephone 6 in the second list L2.

During the step 200 for sending the identifier I, a first message M1 is generated by the telephone 6 and transmitted by the transceiver module 15 to the first transmission module 70.

The first message M1 is sent to the first transmission module 70 by radiofrequency communication.

The first message M1 comprises the identifier I of the telephone 6. In a case where a payment certificate has been transmitted to the telephone 6, the first message M1 comprises for example the payment certificate.

At the end of the step 200 for sending the identifier I, the sales apparatus 45 has received the identifier I.

In the identification step 210, the telephone 6 is identified. This means that at the end of the identification step 210, the sales apparatus 45 has determined whether the user U of the telephone 6 is registered with the operator of the facility 10.

The identifier I received by the sales apparatus 45 is compared to each of the identifiers I of the first list L1.

If the received identifier I is not comprised in the first list L1, an error message ME is displayed on the screen of the second man/machine interface 72 and the method for carrying out a transaction is interrupted.

If the received identifier I is comprised in the first list L1, the identification step 210 is followed by the computation step 220.

During the computation step 220, the signature S is computed.

In the generating step 230, the proof of purchase PA is generated.

For example, the payment certificate comprises all or part of the description data D, ant the proof of purchase PA is generated from the certificate. In particular, generating the proof of purchase PA comprises inserting the signature S into the payment certificate in order to form the proof of purchase PA.

In the sending step 240, the first transmission module 70 transmits a second message M2 to the transceiver module 15.

The second message M2 includes the proof of purchase PA.

The second message M2 is sent to the transceiver module 15 by radiofrequency communication.

The proof of purchase PA is stored in the first memory 40 during the storage step 250.

The step 200 for sending an identifier I, the identification step 210, the computation step 220, the step 230 for generating a proof of purchase PA, the step 240 for transmitting a proof of purchase PA and the storage step 250 therefore allow to finalize the sale of a usage right of a transportation network, since the certificate of payment is validated by the sales apparatus 45 by inserting the signature S in order to form a valid transportation title.

In the generating step 260, a cookie T for the sale is generated.

The cookie T is a set of data comprising information relative to the sale, by the sales apparatus 45, of the product P to the user U. The cookie T is able to allow the centralization device 55 to generate a bill F.

The cookie T for example comprises an amount due Mp and the identifier I. Alternatively, the cookie T further comprises the description data D and/or the signature S.

Following the step 260 for generating the cookie T, a third message M3 is transmitted by the second controller 75 to the third controller 90, during the sending step 270.

The third message M3 includes the cookie T.

The cookie T is stored in a third list L3 of cookies. The third list L3 is stored in the third memory 95.

At the end of the communication step 270, the cookie T has therefore been communicated by the sales apparatus 45 to the centralization device 55.

Lastly, in the billing step 280, the centralization device 55 generates a bill F from the cookie T. Preferably, the centralization device 55 generates the bill F from all of the cookies T comprising the same identifier I.

The bill F is a set of data sent to the user U and able to command the payment, by the user U, of the amount due Mp, if this payment has not been made yet.

For example, the bill F comprises the amount due Mp and the description data D.

The bill F is generated with a fixed frequency, for example monthly. This means that a single bill F is generated each month, and that the bill F includes the amounts due Mp for each of the purchases made by the user U since the previous bill F was issued.

Alternatively, the bill F is generated upon each implementation of the method for carrying out a transaction.

The bill F is sent to the user U over the Internet.

At the end of steps 200 to 280 above, the telephone 10 has received a proof of purchase PA from the sales apparatus 45, and the centralization device 20 has generated a bill F in return. The steps 200 to 280 above therefore form a method for carrying out a transaction.

Figure 3:
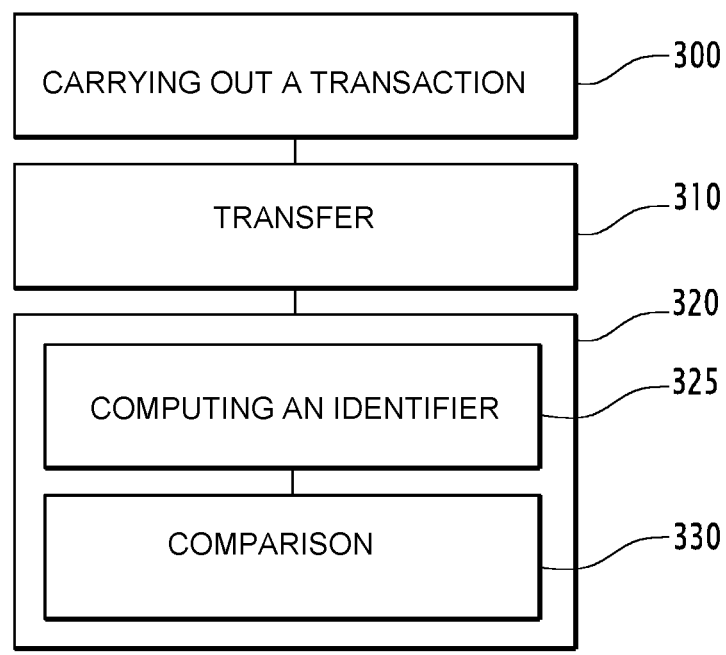
FIG. 3 is a flowchart of one example implementation of the verification method.

FIG. 3 shows the steps of one example method for verifying the proof of purchase PA.

The verification method comprises a step 300 for carrying out a transaction, a transfer step 310 and a step 320 for authenticating the proof of purchase PA.

In the step 300 for carrying out a transaction, the method for carrying out a transaction as defined above is implemented.

At the end of the step 300 for carrying out a transaction, the proof of purchase PA has been generated by the sales apparatus 45 and stored in the memory 40 of the telephone 6.

In the transfer step 310, the transceiver module 15 sends a fourth message M4 to the second transmission module 105.

The fourth message M4 comprises the proof of purchase PA and the identifier I.

At the end of the transfer step 310, the proof of purchase PA and the identifier I have been sent from the telephone 6 to the verification apparatus 65.

In the authentication step 320, the signature S is authenticated by the verification apparatus 65.

This means that the fourth controller 100 verifies that the signature S has a characteristic expected by the fourth controller 100 and generates an authenticity signal Sa based on whether the expected characteristic is present.

For example, when the signature S is a number associated with a particular day, the signature S is compared to a reference signature Sr stored in the fourth memory 112. The reference signature Sr is equal to the signature S stored in the second memory 85.

Alternatively, the fourth controller 100 performs at least one operation from the signature S, and compares the results of the operation to an expected result.

For example, the signature S is a number and the expected characteristic is the value of the sum of the digits of the signature S. The fourth controller 100 computes the sum of the digits of the signature S and compares it to a reference value Vr stored in the fourth memory 112.

Preferably, the authentication step 320 comprises a sub-step 325 for computing an identifier Ic and a comparison sub-step 330.

In the computation sub-step 325, an identifier Ic is computed from the signature S.

When the signature S is a number computed according to the first function F1 from the identifier I of the telephone 6, the computed identifier Ic is computed from the second function F2.

When the signature S is the result of the encryption of the identifier I, the encryption key K is stored in the memory 112 of the verification apparatus 65, and the identifier Ic is computed according to the encryption algorithm A.

According to a second alternative, the verification apparatus 65 computes an index i according to the hash function H, and the computed identifier Ic is set to be equal to the identifier I identified in the second list L2 by the computed index i.

Next, during a comparison step 330, the identifier Ic computed from the signature S is compared to the identifier I comprised in the fourth message M4.

The definition data D is further compared to reference data Dr stored in the fourth memory 112.

If the proof of purchase PA is a transportation title, the reference data Dr is for example identical to the definition data D corresponding to a trip in progress on a train onboard which the verification apparatus 25 is placed.

If the computed identifier Ic is identical to the received identifier I, and the definition data D is identical to the reference data Dr, a compliant signal Sc is emitted by the third man/machine interface 110.

The compliant signal Sc is able to assure a user of the verification apparatus 65 of the authenticity of the proof of purchase PA. The compliant signal Sc for example comprises an audible signal.

Otherwise, a noncompliant signal Sn is emitted by the third man/machine interface 110. The noncompliant signal Sn for example assumes the form of an audible signal different from the compliant signal Sc.

The generation by the sales apparatus 45 of the signature S allows easy verification of the authenticity of the proof of purchase PA. The counterfeiting of the proof of purchase PA then assumes knowledge of the method for computing the signature S.

In particular, since the signature S is generated from the identifier I, the verification apparatus 65 can compare the identifier I of the telephone 6 and the identifier Ic computed from the proof of purchase PA.

The duplication of the proof of purchase PA and its transfer to another telephone 6 are therefore easily detectable by the verification apparatus 65. The method for carrying out a transaction is therefore secure.

Furthermore, the method for carrying out a transaction does not involve transferring data through the wireless telephony network. The method can therefore be implemented by a telephone 6 that is not connected to the mobile telephony network R. In particular, the method for carrying out a transaction can be implemented even in case of failure or saturation of the wireless telephony network R.

The method for carrying out a transaction is therefore reliable.

A second example of a facility 10 will now be described. The elements identical to the first example of FIG. 1 are not described again. Only the differences are discussed.

The second message M2 includes the cookie T.

The third controller 90 is further able to receive the third message M3 via the wireless telephony network R.

The third message M3 is generated by the first controller 20.

During the communication step 270, the telephone 6 sends the third message M3 to the centralization device 55 via the wireless telephony network R.

In particular, the third message M3 is sent via the wireless telephony network R if the wired link between the sales apparatus 45 and the centralization device 55 is damaged.

The method for carrying out a transaction is then more robust.

The invention claimed is:

1. A method for selling transportation titles using an electromechanical automaton and a mobile telephone comprising a first memory for storing an identifier, the identifier being able to identify the mobile telephone uniquely, the method comprising:
   a) receiving the identifier via radiofrequency communication by the electromechanical automaton,
   b) storing the identifier in a memory of the electromechanical automaton,
   c) identifying the mobile telephone by the electromechanical automaton from the received identifier,
   d) generating, by the electromechanical automaton, a transportation title in the memory of the electromechanical automaton,
   e) computing a signature in the memory of the electromechanical automaton, and
   f) inserting the signature in the transportation title, the signature being able to authenticate the transportation title,
   wherein the method is carried out by the electromechanical automaton, and wherein the electromechanical automaton is able to punch a physical transportation title.

2. The method for carrying out a transaction according to claim 1, wherein the signature is computed by the electromechanical automaton from at least the received identifier.

3. The method for carrying out a transaction according to claim 2, further comprising:
   g) sending the transportation title from the electromechanical automaton to the mobile telephone by radiofrequency communication.

4. The method for carrying out a transaction according to claim 1, wherein the radiofrequency communications have at least one frequency greater than or equal to 2400 MegaHertz and less than or equal to 2483.5 MHz.

5. The method for carrying out a transaction according to claim 1, wherein the method comprises:
   d) generating by the electromechanical automaton a cookie for the sale,
   e) communicating by the electromechanical automaton the cookie to a remote electronic device, and
   f) generating by the remote device a bill from at least the received cookie.

6. A method for verifying the purchase of a transportation title via a mobile telephone according to claim 3, the method further comprising:
   g) carrying out a method for performing a transaction according to claim 3,
   h) transferring the transportation title from the mobile telephone to a verification apparatus by radiofrequency communication; and
   i) authenticating by the verification apparatus of the signature of the transportation title.

7. The method for carrying out a transaction according to claim 6, the method further comprising:
   j) transferring the identifier from the mobile telephone to the verification apparatus, and
   k) computing by the verification apparatus, of an identifier computed from the signature,
   wherein the authentication comprises
   l) comparing the computed identifier and the received identifier.

8. A method for selling transportation titles using an electromechanical automaton able to punch a transportation title and a mobile telephone comprising a first memory for storing an identifier, the identifier being able to identify the mobile telephone uniquely, the method comprising:
   a) receiving the identifier via radiofrequency communication by the electromechanical automaton able to punch a transportation title,
   b) storing the identifier in a memory of the electromechanical automaton, c) identifying the mobile telephone by the electromechanical automaton able to punch a transportation title from the received identifier,
d) generating, by the electromechanical automaton able to punch a transportation title, a transportation title in the memory of the electromechanical automaton,
e) computing a signature in the memory of the electromechanical automaton, and
f) inserting the signature in the transportation title, the signature being able to authenticate the transportation title, wherein the method is carried out by an embedded controller; and wherein the electromechanical automaton is able to punch a physical transportation title.

\* \* \* \* \*